United States Patent

Young

[15] 3,640,305
[45] *Feb. 8, 1972

[54] CONNECTION FOR SPOUT ADJUSTMENT

[72] Inventor: Stephen A. Young, c/o Stephen A. Young Corp., Flora, Ind. 46929

[ * ] Notice: The portion of the term of this patent subsequent to July 15, 1985, has been disclaimed.

[22] Filed: Apr. 24, 1969

[21] Appl. No.: 818,902

[52] U.S. Cl...............137/360, 4/192, 277/166, 285/193, 285/351, 285/355, 137/329.06
[51] Int. Cl..........................F16l 5/00, F16l 17/02
[58] Field of Search ............137/359, 360, 801, 329.06; 285/347, 351, 349, 355, 357, 298, 193; 4/148, 191, 192; 277/166

[56] References Cited

UNITED STATES PATENTS

| 2,246,436 | 6/1941 | Downey | 285/349 X |
| 2,846,691 | 8/1958 | Zetting | 4/148 |
| 3,025,085 | 3/1962 | Young | 137/360 X |
| 3,392,746 | 7/1968 | Young | 137/360 |

FOREIGN PATENTS OR APPLICATIONS

| 288,788 | 3/1965 | Netherlands | 285/355 |

Primary Examiner—Henry T. Klinksiek
Attorney—Robb & Robb

[57] ABSTRACT

The disclosure herein relates to plumbing fittings and primarily to concealed plumbing fittings of the type in which a valve body is mounted behind a wall surface and provides for regulation of liquid flow outwardly from the wall surface through some kind of a connection, in this instance comprising an elbow at the outer end of which is provided a threaded section adapted to engage a corresponding threaded section of a spout, the threads providing for adjustment to compensate for varying positions of the valve within the wall and it being necessary to furnish some kind of sealing means to prevent leakage. The leakage in this instance is overcome by the provision of an O-ring section in the threaded section of the valve unit elbow upon which the O-rings are seated, the O-rings in turn engaging the threads in the spout to effect the leakage prevention and sought hereby.

3 Claims, 2 Drawing Figures

PATENTED FEB 8 1972   3,640,305

INVENTOR.
S. A. YOUNG
BY Robert Robb
   attorneys

CONNECTION FOR SPOUT ADJUSTMENT

DESCRIPTION OF THE INVENTION

A particular purpose of the instant invention is to make possible the mounting of a fitting known as a two-valve or shower or tub fitting as used in domestic plumbing installations, with respect to a wall surface in such a manner that irrespective of the ultimate finish position of the wall surface, a spout may be positioned on and adapted to direct waterflow to a tub and adjustable with respect to the fixture so that the various inequalities in construction may be compensated for and overcome.

A particular object of the invention is to provide an elbow construction adapted to connect a two-valve body for example, and extend outwardly from a wall to furnish a seating position for a spout, the elbow in this instance being provided with a threaded section in which threaded section O-rings are designed to be positioned, the O-rings in turn engaging a threaded section of the spout mounted on the elbow in contrast and what may be said to be, contrary to usual practice in construction of this nature.

A particular object of the invention is to construct an elbow in which the same is fabricated of a tubular body having an adapter at one end to connect the same to the valve body, and at the other end a connecting section in which O-ring grooves or a single groove if preferred, may be provided, with O-rings seated therein, the O-rings in turn being forced to engage the threaded section of a spout screwed upon the connector and prevent leakage between the respective threads of the connector and spout. The adjustment of the spout along the threads toward the wall being a one-time proposition so to speak, and thus irrespective of the actual mutilation of the O-rings, nevertheless effectively sealed against leakage.

A further object of the invention is to provide a construction involving sealing of threads with O-rings which permits the replacement of a spout if necessary, but necessitating the replacement of the O-rings used for sealing the same at such time as the spout is changed or removed for any particular purpose.

Other and further objects of the invention will be understood from a consideration of the specification appended hereto and disclosed in the drawing wherein.

Figure 1:
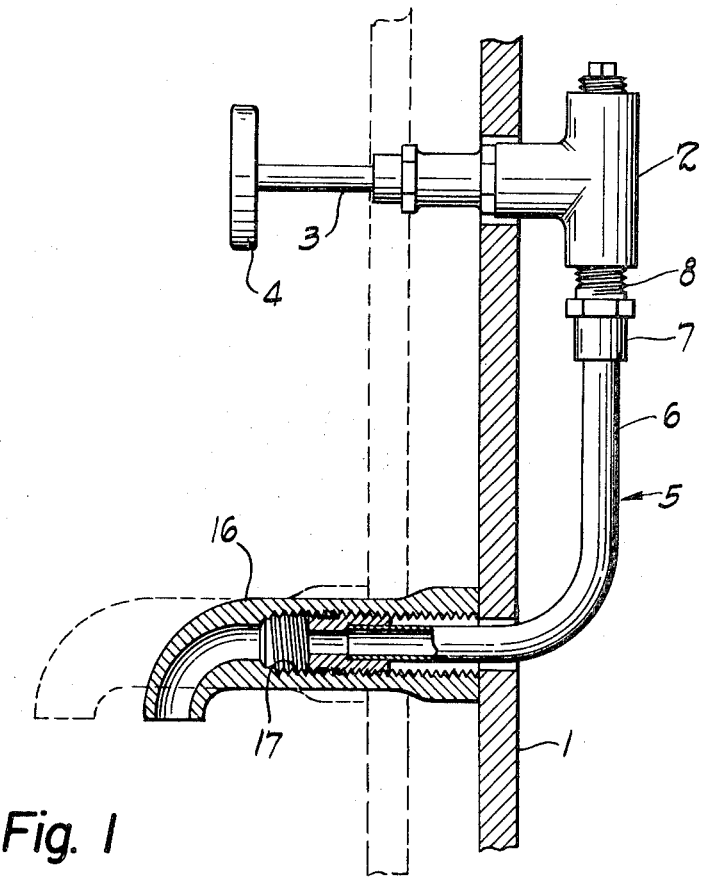
FIG. 1 is a vertical sectional view, somewhat fragmentary in nature through a section of a wall, illustrating the position of a valve and the associated elbow and spout mounted thereon.

Referring to the drawing, in FIG. 1, a wall surface such as is provided by the usual plaster surface of whatever composition is indicated at 1, with a valve body 2 mounted suitably therebehind, this valve body having an inlet (not shown) and a control stem 3 extending outwardly from the wall and being provided with a handle 4 at the end thereof.

Extending from the lower end of the valve body 2 is shown an elbow generally denoted 5, which in this instance is comprised of a tubular member 6 formed in a generally L-shaped arrangement, there being an adapter 7 at the upper end of the body 6, suitably soldered thereto and engaging by threads 8 formed thereon in threads formed at the lower end of the valve body 2 to provide a sealed connection therewith.

Figure 2:
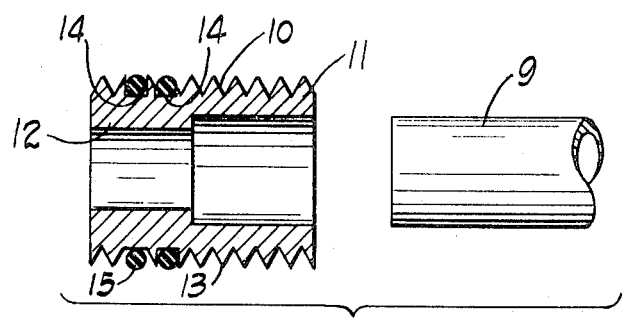
FIG. 2 is an enlarged view, partly fragmentary illustrating in section the construction of the connector and mounting of the O-rings thereon.

At the opposite end of the elbow 5 and at the end indicated in FIG. 2 at 9, there is positioned a connector designated 10 which includes a shouldered section 11 to receive the end 9 therein and be soldered thereto, and an O-ring supporting section 12 integral therewith.

The connector 10 is equipped with threads 13 which extend along the outer surface of said connector, and in the section 12 thereof there is provided a pair of O-ring grooves 14 of identical form and of any preferred shape which will receive and support O-rings such as 15 therein, which O-rings as to their external diameters will extend somewhat beyond the threads for purposes which will hereinafter be set forth.

Turning now to a consideration again of FIG. 1, a spout indicated at 16 is shown as being mounted on the end of the elbow 5 as by the connector 10 previously described, the threads 13 of said connector engaging corresponding or comating threads 17 formed interiorly of the spout 16, and providing thereby for adjustment of the spout along the end of the elbow 5 to accommodate for varying positions of the valve body 2 behind the wall surface 1, as suggested by the dotted lines for the respective parts l and spout 16.

As will be understood, the spout 16 is initially caused to engage the threads 13 by the threads 17 within the spout, when installation of the spout is to be effected, and thereafter by suitable manipulation of the spout caused to engage the threads of the connector, and at the same time of course the threads 17 within the spout move along over the O-rings 15 in the said connector.

Since continual movement or action of this kind would mutilate the O-rings, ordinarily this would be an undesirable type of arrangement, but since the spout is only intended to be emplaced on the end once when it is initially positioned for ultimate use, it will be apparent that the mutilation of the O-rings 15 is not such as to prevent the sealing action which they are furnished to provide, but on the other hand actually promotes the sealing action by this arrangement.

It is pointed out that while this is contrary to accepted practice where the use of O-rings is concerned, it is the contemplation of this invention that this provides the necessary seal at the end, and in an inexpensive manner to very effectively permit the adjusting positioning of the spout as set forth.

It will be apparent that if the spout should ever require to be removed and replaced, O-rings 15 might be replaced likewise, and the sealing action effected again in respect to such newly installed O-rings and effectively maintained thereby thereafter.

I claim:

1. In concealed fitting construction of the class described, in combination, a valve body for mounting behind a wall surface, inlet and outlet means for said body, control means extending through the said surface for regulating flow from the inlet to the outlet, an elongated elbow extending from the outlet aforesaid through the said surface to direct flow of liquid beyond said surface, a male threaded portion at the extremity of the said elbow, an O-ring groove in the threads, an O-ring seated in the groove, and a spout member having a passage therethrough, said passage having a threaded section to engage the portion and adjustable therealong, said O-ring effecting a seal against liquid flow between said threads in the various adjusted positions of the said spout necessary to accommodate for varying locations of the fitting and elbow with respect to the wall surface.

2. Fitting construction as claimed in claim 1 wherein at least a pair of O-ring grooves are formed in the threads of said portion for sealing contact with the threaded section of the spout.

3. Fitting construction as claimed in claim 1, wherein the elbow comprises a tubular body bent to form an L-shaped part, an adapter is mounted at one end to connect the part to the valve body, and the threaded portion is formed on a connector soldered at the other extremity of the part, said connector having a shouldered section to engage said extremity and an O-ring supporting section therebeyond, the threads being formed along said sections adjacent the O-ring groove.

* * * * *